June 16, 1931.   W. J. KATTREIN ET AL   1,809,975
HELICAL BLADED REAMER
Filed May 13, 1926
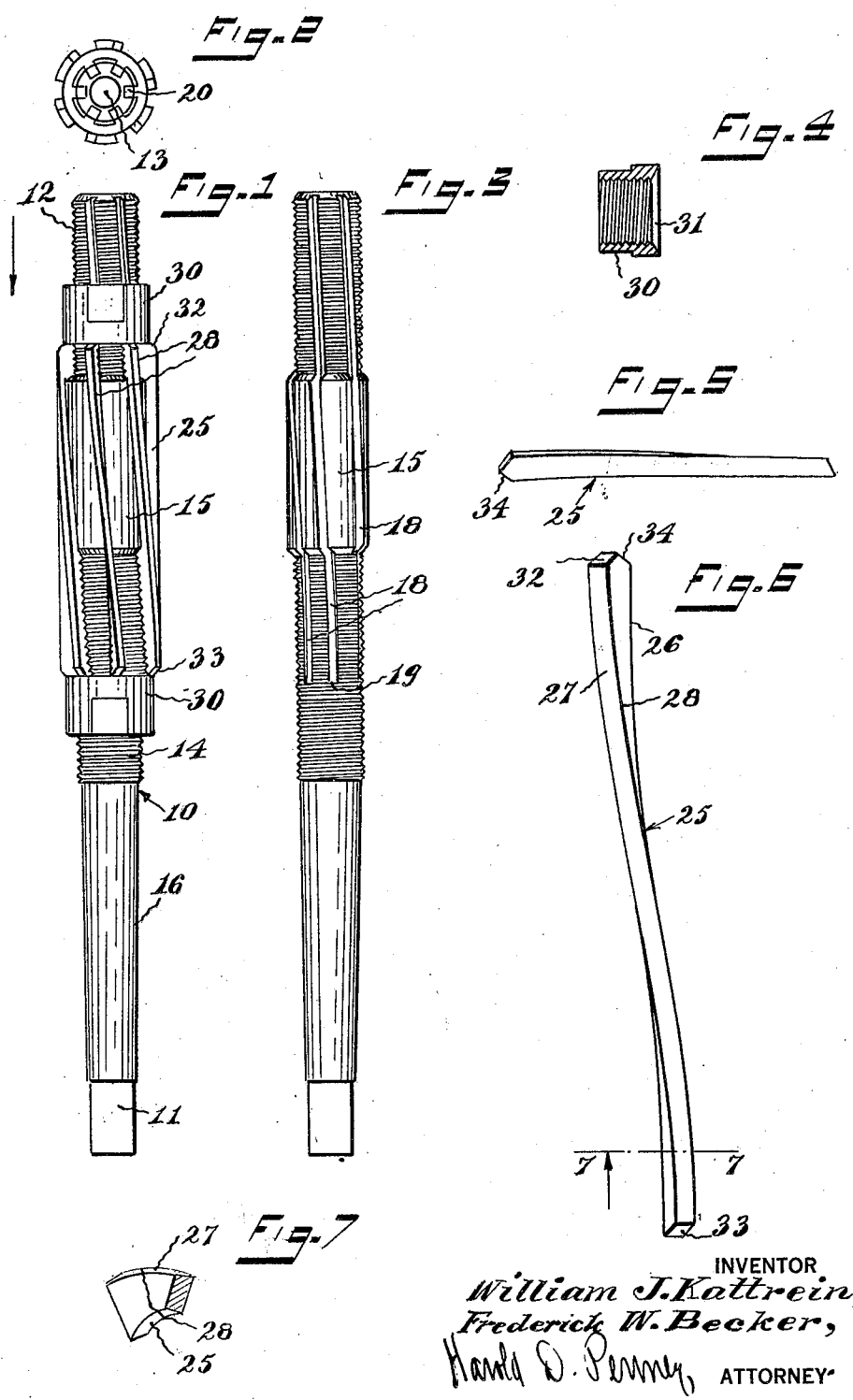
INVENTOR
William J. Kattrein,
Frederick W. Becker,
ATTORNEY Patented June 16, 1931

1,809,975

UNITED STATES PATENT OFFICE

WILLIAM J. KATTREIN AND FREDERICK W. BECKER, OF ALBANY, NEW YORK, ASSIGNORS TO WATERVLIET TOOL CO., INC., OF ALBANY, NEW YORK, A CORPORATION OF NEW YORK

HELICAL BLADED REAMER

Application filed May 13, 1926. Serial No. 108,857.

This invention relates to expanding reamers and methods of making them, and more particularly to expanding reamers of the kind having a plurality of blades simultaneously slidable in a plurality of twisted grooves, the cutting edges being helically arranged to avoid chattering.

Heretofore it has been known to provide a reamer body with a plurality of somewhat convergent straight grooves, the bottoms of which are inclined to planes radial to the axis of the body. Blades having straight seats are slidably adjustably seated in said grooves respectively, the cutting edges of which may lie in an imaginary substantially cylindrical surface for only one position of adjustment. For every other position of adjustment the cutting edges depart somewhat from such a surface, and if the adjustment is considerable, the cutting edges are so converged that the reamer cannot then be practically used for reaming cylindrical holes. The adjustment of such reamers is very limited, and our reamer overcomes this defect.

Similar reamers with the grooves arranged in planes radial to the axis of the body are objectionable because of chattering.

One object of our invention is to provide an expanding reamer of this kind having helical cutting edges, which may have a more pronounced angle of shear and a wider range of adjustment than heretofore.

Another object of the invention is to provide a reamer of this kind which may be made longer than those heretofore known and still have a wide range of adjustment for reaming cylindrical holes.

Another object of the invention is to provide an improved method of making a reamer body of this kind.

Another object of the invention is to provide a reamer of this kind having a greater angle of rotation between the ends of each groove than heretofore.

Other objects of the invention are to improve generally the simplicity and efficiency of such reamers and methods and to provide a device or apparatus of this kind which will not chatter and which is economical, durable and reliable in operation, and economical to manufacture.

Still other objects of the invention will appear as the description proceeds; and while herein various dimensions, relations and other details of an embodiment of the invention are described and claimed, the invention is not limited to these, since many and various changes therefrom may be made without departing from the scope of the invention as claimed in the broader claims.

The inventive features for the accomplishment of these and other objects are shown here in connection with an improved expanding reamer which, briefly stated, includes a body provided with a plurality of slightly helical grooves, the bottoms of which lie on an imaginary conical surface pointed toward the forward end of the body, said grooves receiving a plurality of helically twisted blades longitudinally slidably adjustably seated in the grooves respectively and each having a helical forward cutting edge, all of said blades being so tapered relative to said conical surface that said cutting edges will lie in an imaginary substantially cylindrical surface, which will be true for every position of adjustment of the blades.

In the accompanying drawings, showing by way of example, one of many possible embodiments of the invention, Fig. 1 is a side elevation showing the complete reamer;

Fig. 2 is an end elevation showing the reamer, looking in the direction of the arrow of Fig. 1;

Fig. 3 is a side elevation showing the body with blades and collars removed;

Fig. 4 is an axial sectional view of one of the collars;

Fig. 5 is a side elevation of one of the blades;

Fig. 6 is an edge elevation, on a large scale, showing the outer edge face of one of the blades; and Fig. 7 is a sectional view taken on the line 7—7 of Fig. 6, looking in the direction of the arrow of said line.

Our improved reamer comprises a substantially cylindrical body 10 having a squared tool receiving rear end 11, a threaded forward end portion 12 at the opposite end, a centering hole 13 (Fig. 2) in the forward end, an intermediate or inner threaded portion 14 along the middle part of the body, an enlarged portion 15 between the threaded portions, and a smooth part or shank 16 between the inner threaded portion 14 and the squared end and of smaller diameter than the threaded portions.

The body is provided in said threaded and enlarged portions 12, 14 and 15 with a plurality of slightly helical grooves 18 of rectangular cross section and herein shown as extending a distance of more than seven times the diameter of the threaded portions, though the invention is not thus limited, and extending from near the middle part of the inner threaded portion 14, through the enlargeed portion 15 and the threaded end portion 12, the part of each groove in each of said portions having a depth gradually increasing toward the forward end of the body, the depth of the groove decreasing to zero, as at 19 (Fig. 3) at the rear end of the groove, the bottom 20 (Fig. 2) of the groove at its forward end almost intersecting the centering hole 13 approximately tangential to the edge of the hole.

The amount of rotation between the ends of the same groove is shown herein to be about 60 degrees, though the invention is in no way limited to this feature.

The mid part of each transverse line at each point of the bottom of the groove throughout the length of the groove, irrespective of the length and amount of rotation of the groove, is substantially perpendicular to the radius passing through such part and the axis of the body, whereby the groove at every point throughout its length is symmetrical to a radius at said point, and whereby the mid part of the bottom of each groove lies tangential to an imaginary true conical surface pointed toward the forward end of the body.

A plurality of helically twisted blades 25 are slidably received in said grooves respectively, and each has its inner edge face parts 26 conformably seated in the groove, and its outer edge face slightly beveled to form a helical forward cutting edge 28 substantially throughout the outer and inner edge faces 26 and 27 of each blade being relatively rearwardly converged, so that said cutting edges at all times lie in an imaginary substantially true cylindrical surface.

Interiorly threaded tool receiving collars or nuts 30 received on said threaded portions 12 and 14 at opposite ends of the blades are each provided with a countersunk inner end face 31 (Fig. 4) forming an inner conical face adapted to conformably engage inclined end faces 32 and 33 of the blades, to hold the blades in place or to simultaneously shift the blades longitudinally in either direction to vary the effective diameter of the reamer and the cut of the blades. The end 32 is also beveled at 34 to obviate too sharp a point at that end.

A suitable method of making the reamer body is to mount the body between centers for partial rotation on its own axis and then cut the groove, moving a cutting tool in a straight line approximately parallel to but slightly converging toward said axis, holding the mid part of the cutting edge or the effective cutting transverse to the axis and perpendicular to the radius of said axis, at the same time uniformly rotating said body as said tool moves. The reamer blades are twisted to helical form to conformably seat in the grooves.

The amount of twist that may be given to the blades and grooves is practically unlimited, thus insuring a reamer that will not chatter. The amount of adjustment possible while still maintaining a reamer which will ream a true cylinder is great and for any given diameter is limited only by such a convergence as would cause the forward ends of the groove almost to intersect. This gives a very large amount of adjustment.

We claim as our invention:

1. In combination, a body having a plurality of spirally arranged grooves of relatively narrow width having their bottoms lying in an imaginary cone; twisted blades fitted in said grooves respectively and tapered reversely to the cone; said blades being to a substantial degree flexible to permit flexure when in the grooves, whereby they may be sprung to rest on the bottom of the grooves; means to hold the ends of the blades against the bottoms of the grooves and to shift the blades longitudinally in the grooves.

2. In combination, a body having threaded portions, and a plurality of spirally arranged grooves of relatively narrow width, between the threaded portions, having their bottoms lying in an imaginary cone; twisted blades fitted in said grooves respectively and tapered reversely to the cone; said blades being to a substantial degree flexible to permit flexure when in the grooves, whereby they may be sprung to rest on the bottom of the grooves; and nuts received on said threaded portions at opposite ends of the blades and formed to engage over said blades to hold the ends of the blades against the bottoms of the grooves and to shift the blades longitudinally in the grooves.

Signed at Albany, in the county of Albany and State of New York this 10th day of May, A. D. 1926.

WILLIAM J. KATTREIN.
FREDERICK W. BECKER.